United States Patent [19]

Cormier

[11] Patent Number: 4,859,325
[45] Date of Patent: Aug. 22, 1989

[54] WASTE MATERIAL TREATMENT APPARATUS

[76] Inventor: Murphy Cormier, Rte. 14, Box 1935, Lake Charles, La. 70605

[21] Appl. No.: 183,228

[22] Filed: Apr. 19, 1988

[51] Int. Cl.$^4$ ............................................. B01D 21/00
[52] U.S. Cl. ................................. 210/195.3; 210/220; 210/521
[58] Field of Search ...................... 210/195.3, 220, 521, 210/221.1, 626–629, 195.4

[56] References Cited

U.S. PATENT DOCUMENTS

| | | | |
|---|---|---|---|
| 2,987,186 | 6/1961 | Burgoon et al. | 210/220 |
| 3,195,727 | 7/1965 | Kibbee | 210/195.4 |
| 3,206,032 | 9/1965 | Nottingham et al. | 210/221.1 X |
| 3,805,957 | 4/1974 | Oldham et al. | 210/220 X |
| 3,951,817 | 4/1976 | Snyder | 210/521 |

Primary Examiner—Charles Hart
Attorney, Agent, or Firm—Anthony A. O'Brien

[57] ABSTRACT

A sewage or waste material treatment plant or apparatus includes adjacent aeration and clarifier chambers with an intermediate internal wall having a bottom opening normally providing the sole communication between the chambers. A deflector member in the upper portion of the aeration chamber in the path of incoming material, a deflector surface on the lower portion of the internal wall, together with a diffuser assembly, provides a substantially circular flow of fluid and solids to promote maximum suspension of solids and their oxidative or bacteriological breakdown. A specially configured deflector on the lower portion of the internal wall further directs the moving fluid in the aeration chamber so as to promote the circular movement of material therein and also to enhance the return of settled floc from the adjacent clarifier chamber back into the circulating stream in the aeration chamber. The deflector member in the path of the incoming material also works in concert with a fixed skimmer device to provide a solution for drawing floating accumulations from the clarifier chamber to the aeration chamber. In a preferred embodiment, unique motion attenuating means in the clarifier chamber allows the use of unusually high air flow volumes to the aeration chamber without adversely affecting floc and float material recycling functions of the apparatus.

13 Claims, 2 Drawing Sheets

WASTE MATERIAL TREATMENT APPARATUS

BACKGROUND OF THE INVENTION

This invention relates generally to sewage or other waste material treatment facilities, and more particularly, to an improved, self-contained, transportable, treatment plant or apparatus having a reduced number of chambers therein yet constructed in a manner to provide improved sewage treatment in a most efficient manner.

Self-contained, transportable sewage treatment plants or apparatus have been available for some time and typically are constructed of cast concrete, fabricated in suitable molds designed to form a unitary construction having the required number of chambers therein. The migration or passage of fluids and solids through the various chambers, e.g., aeration and clarifier chambers, usually relies upon the force of gravity and the flotation forces of aeration devices present in the apparatus. Such apparatus is disclosed, for example, in U.S. Pat. Nos. 3,195,727 and 3,805,957. One of the most important aspects, however of sewage treatment apparatus is its capacity to maximize the oxidation or biodegradation of various materials in the waste stream which typically will have components of many different chemical compositions having different specific gravities, densities, sedimentation rates, surface ionic or surface tension characteristics, and other properties which affect, e.g., flocculation or flotation tendencies. A principal factor in achieving this maximum treatment is the capacity of the apparatus to provide adequate agitation or turbulence to the waste material, particularly during the aeration treatment, while facilitating recycling of flock and low density or float material which have not received a satisfactory degree of aeration. This simultaneous need for maximum settling-out of floc and isolation of said float materials at the top of the clarifier chamber has led to structures such as presented in the aforesaid patents. Such structure, however, fails to maximize the efficiency of these operations as will become apparent in comparison with the present invention described herein.

Objects therefore of the present invention are: to provide waste treatment apparatus which promotes the maximization of aeration efficiency in an aeration chamber while providing for adequate settling of floc and flotation of low density materials in a clarifier chamber for recycle to the aeration chambers; to provide in a preferred embodiment, such apparatus which can accommodate unusually high air volume flow and turbulence in the aerator chamber while maintaining effective floc settling and low density material flotation in the clarifier chamber; and to provide such apparatus in highly simplified structural form which lends itself to economical manufacture, installation, use, and maintenance.

These and other objects hereinafter becoming evident have been attained in accordance with the present invention one embodiment of which comprises the structural combinations and features of wasted material treatment apparatus comprising wall and floor means providing an aeration chamber having a material inlet, and a clarifier chamber having a material outlet, said chambers being separated by internal wall means having its lower edge spaced from said floor means to provide transfer port means interconnecting said chambers, skimmer conduit means in an upper portion of said internal wall means interconnecting said chambers, said port means and said conduit means being adapted to transfer floc and float material (low density material) respectively from said clarifier chamber to said aeration chamber, a material flow directing system adapted to promote the movement of said floc and float material to the aeration chamber for further aeration, said system comprising a first deflector surface in said aeration chamber in line with said inlet and comprising a first deflection surface slanting downwardly generally toward said internal wall means and floor means, the lower edge of said surface lying adjacent an outlet of said skimmer conduit means, a second deflector surface on said internal wall means adjacent the lower edge thereof and slanting generally toward said floor means in a generally opposite direction to said first deflector surface, and diffuser means mounted in said aeration chamber and having its outlet positioned adjacent said floor means and wall means positioned generally opposite said internal wall means, said deflector surfaces and diffuser means in cooperation with the contiguous wall means and the incoming material flow path constituting a substantially closed circulation loop providing diminished pressure zones in said aeration chamber adjacent said transfer port and said outlet of said skimmer conduit means.

In another embodiment of the present invention the waste material treatment apparatus comprises floor, end, and side wall means defining a container for receiving, treating, and discharging said material, internal wall means within said container dividing the same into substantially isolated aeration and clarifier chambers, said floor means to provide in cooperation with said floor means a material transfer port between said chambers, diffuser means in said aeration chamber near the top thereof, and material outlet means in communication with said clarifier chamber near the top thereof, and motion attenuating means mounted in said clarifier chamber intermediate said transfer port and said outlet means for reducing the motion of material in said clarifier chamber and enhancing thereby the settling of floc therefrom for return to said aeration chamber through said port means.

By means of the present invention, an improved system is provided which is capable of adequately processing a wide range of input flows, for example from about 500 to about 1500 or more gallons per day, and which includes but a single aeration chamber adjacent a single communicating clarifier chamber.

Bacteriological decomposition or oxidation of material located in the aeration chamber is vastly enhanced by the specific disposition of a deflector surface in the path of incoming material, and a diffuser assembly, which assist in producing a generally circular, movement of the material contained therein. An internal wall or baffle separates the single aeration chamber from the single clarifier chamber with the only normal communication therebetween comprising a transfer port formed adjacent the bottom of this baffle. A unique construction of the lowermost portion of this internal wall cooperates with the substantially downward flow of material adjacent thereto to provide a fluid flow which allows treated liquid from the aeration chamber to pass into the adjacent clarifier chamber, while concurrently promoting the return of any settled material in the clarifier chamber to the aeration chamber.

With the above and other objects in view, which will more readily appear as the nature of the invention is better understood, the invention consists of a novel construction, combination and arrangement of parts hereinafter more fully described, illustrated and claimed, with reference being made to the attached drawing.

DESCRIPTION OF THE PROPOSED EMBODIMENT

Figure 2:
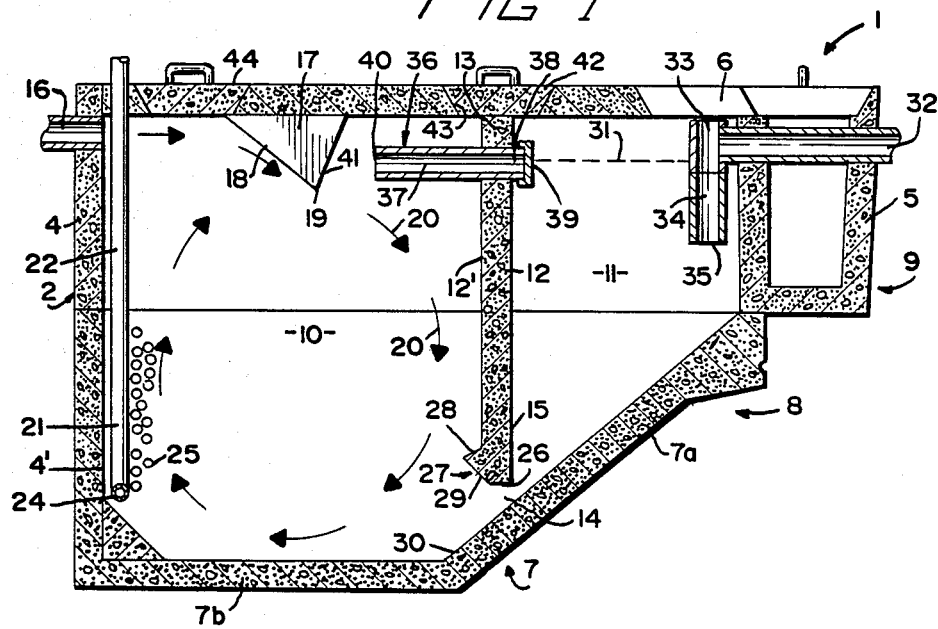
FIG. 2 is a vertical sectional view taken along the line 2—2 of FIG. 1.

Referring now to the drawing, the present invention will be seen to relate to a sewage treatment plant, generally designated 1, and which preferably comprises a generally rectangular casing 2 having sidewalls 3, inlet wall 4, and outlet wall 5. A top wall 6 and bottom wall 7 complete the general external configuration of the casing 2, which is preferably constructed form precast concrete. The casing may be initially fabricated as a single component, or alternatively, as a separate lower section 8 and upper section 9 with appropriate mating interfaces between the two juxtaposed sections to allow a positive fluid type fit therebetween when stacked such as depicted in FIG. 2. This latter alternative not only facilitates the initial fabrication of the casing 2, but also eases the transport and installation burdens since each section 8 and 9 may be handled separately, with the final joining together being accomplished as the sections are sequentially lowered into a provided excavation at the site of intended use. Additionally, the two-section approach permits employing a single lower section 8 with upper sections 9 constructed of different heights to satisfy varying specifications.

The interior of the casing 2 is divided into but two main chambers, namely, an aeration chamber 10 disposed adjacent the inlet wall 4, and a smaller clarifier chamber 11, separated from the aeration chamber by a vertical wall or baffle 12. The top 13 of this baffle wall is integral with or otherwise provides a fluid-tight joint with respect to the casing top wall 6, such that normally, the only communication between the aeration chamber 10 and clarifier chamber 11 is a transversely extending pathway or slot 14 between the bottom 15 of the vertical wall 12 and the adjacent bottom wall 7 of the casing.

Figure 1:
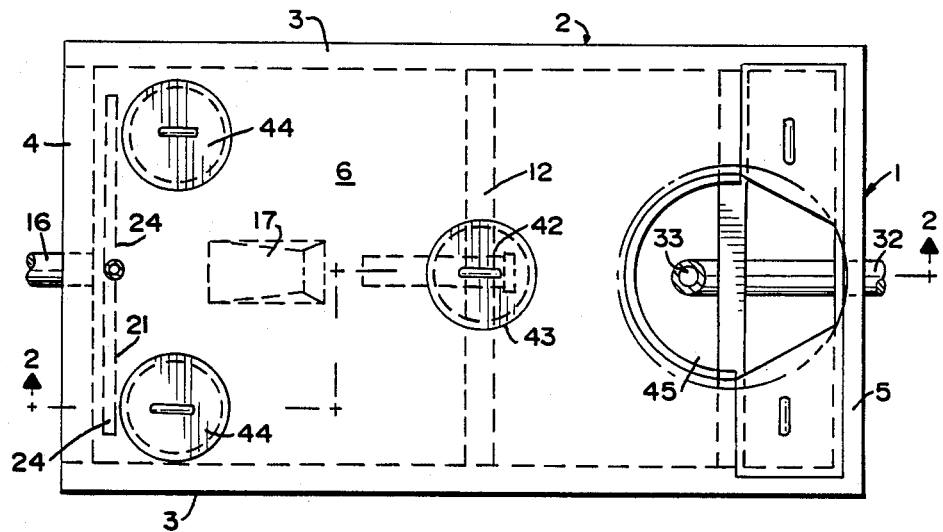
FIG. 1 is a top plan view of a sewage treatment system according to one embodiment of the present invention.

The normal flow of sewage through the plant 1 will now be described with the additional structure provided to facilitate this movement and promote the bacteriological decomposition of the sewage. The raw sewage enters the aeration chamber 10 through the inlet pipe 16 disposed through the inlet wall 4 immediately beneath the level of the casing top wall 6. This incoming flow initially is directed toward the vertical wall 12 by the very momentum of its being delivered through the inlet pipe 16. As will be seen in the plan view of FIG. 1, the inlet pipe is medially disposed transversely of the inlet wall 4, and located likewise along the longitudinal center axis of the casing is a deflector or block member 17 having a transverse dimension greater than the diameter of the inlet pipe 16.

The block member 17 is provided with a first inclined surface 18 opposed to the inlet 16 and terminating in a lower edge 19 located in a plane substantially below the plane of the inlet pipe 16. With the foregoing construction, it will be apparent that incoming sewage striking the inclined surface 18 of the block member 17 will be urged in a downward manner toward an area of the baffle 12 that is well below the baffle top 13, as depicted by the arrows 20 in FIG. 2. The continued momentum of incoming sewage assists in maintaining this clockwise flow of the contents of the aeration chamber, as viewed in FIG. 2; and this movement is enhanced as well as maintained when no raw sewage is being introduced, through the action of a diffuser assembly, generally designated 21.

The diffuser assembly 21 includes a supply pipe or line 22 leading from a suitable air compressor 23 to a diffuser bar 24 located adjacent the casing inlet wall 4, just above its bottom wall 7. The diffuser bar 24 may assume any of various configurations but preferably comprises an elongated, horizontally disposed element extending substantially the width of the aeration chamber 10, and which is provided with a plurality of jets or nozzles for allowing of the escape of air from within the diffuser bar 24 as supplied by the line 22. With the foregoing in mind, it will be understood that upon operation of the compressor 23, air bubbles issue from throughout the extent of the diffuser bar 24, and rise to the top of the aeration chamber in a plane generally vertically disposed adjacent the inner surface 4' of the inlet wall 4. This injection of air within the contents of the aeration chamber 10, accomplishes two purposes. First, the aeration is necessary to supply sufficient oxygen in support of the bacteriological decomposition of the sewage; and secondly, with the above described arrangement, the upward movement of the air bubbles 25 adjacent the inlet wall inner surface 4' maintains the illustrated clockwise and substantially circular flow of the aeration chamber contents in a manner designed to maximize the suspension and resultant treatment of the sewage therein. Thus, even when no raw sewage is being admitted into the chamber, operation of the diffuser assembly 21 assures the illustrated fluid movement along with all contained solids. With this arrangement, no mechanical, moving agitator mechanism is required as will be found in many prior systems.

The foregoing described circulation is further enhanced by means of a particular construction in the area of the bottom 15 of the baffle wall 12. The distal portion of this bottom 15 comprises the lower surface 26 spaced above the inclined segment 7a of the casing bottom to thereby define the previously mentioned pathway or opening 14. Immediately above the baffle lower surface 26 is a projection generally designated 27 in which will be seen to extend laterally into the aeration chamber 10. This projection is defined by a downwardly inclined surface 28 joined to an inclined surface 29 extending upwardly from the lower surface 26. It will now follow that as fluids and suspended solids in the aeration chamber are circulated downwardly adjacent the inner surface 12' of the baffle 12, that fluid passing immediately juxtaposed this inner surface, in the area of the bottom 15 of the baffle, will strike the downwardly inclined surface 28 of the projection 27 and be directed in a clockwise manner across the segment 7b of the casing floor. This latter floor segment comprises the majority of the bottom wall of the aeration chamber. The fact that the inclined segment 7a of the bottom wall for the clarifier chamber 11 continues past the vertical plane of the baffle 12, provides an inclined top surface 30 which additionally encourages the aforementioned clockwise circular flow in view of its inclination generally corresponding to the circulation path.

The opening or pathway 14 beneath the baffle 12 serves a two-fold purpose. First, it allows treated fluid from the aeration chamber 10 to fill the clarifier chamber 11 to at least the top fluid level 31 therein, which level corresponds to the bottom surface of the discharge opening provided by the outlet pipe 32. As is conventional, this outlet pipe 32 is disposed in a horizontal plane slightly below that of the inlet pipe 16. The end of the outlet pipe disposed within the clarifier chamber is provided with a T-fitting 33 with the bottom portion thereof being joined to an entrance pipe 34 having its lower opening 35 disposed in a plane substantially beneath that of the outlet pipe 32. With this arrangement, impurities which are directed into the fluid of the clarifier chamber 11 and which are of a specific gravity less than that of water, float to the area of the top fluid level 31 and thus will not be drawn into the outlet pipe 32 in view of the lowered positioned of its opening 35.

Small suspended particles making their way into the clarifier chamber 11 will settle out therein and strike the top surface 30 of the casing bottom wall segment 7a, and in view of its steep inclination, will gravitate toward the opening 14. The aforedescribed function of the projection 27 at the lower end of the baffle wall 12 insures that these particles gravitating to the area of the pathway 14 will be positively drawn into the mass of circulating fluids contained in the aeration chamber 10. The slight negative pressure or suction created by the circulating fluid striking the projection inclined surface 28 assures the foregoing action for recirculation of these returned particles while the extension of the inclined bottom wall segment 7a into the aeration chamber further encourages gravity to direct these particles toward the circulation fluid.

Skimmer means must be included in a treatment plant to allow for the removal of floating contaminants accumulating adjacent to the top fluid level 31 of the clarifier chamber 11. The improved efficiency offered by the present invention has shown that the operation of any such skimmer means is required very infrequently. However, a skimmer assembly 36 is provided and involves no moving components, yet offers a quick and extremely effective removal of floating contaminants from the clarifier chamber and their return for recycling within the aeration chamber 10. The skimmer assembly 36 includes a horizontal conduit 37 fixedly projecting through the upper portion of the baffle wall 12 and which is vertically located to insure that the majority of its cross-sectional area is in a horizontal plane below the fluid level 31 as shown in FIG. 2 of the drawing. On the other hand, for the most efficient operation, at least a portion of the cross-sectional area of the conduit 37 should be disposed above the depicted fluid level 31. During normal operation of the sewage treatment plant 1, the conduit 37 is closed at its end 38 located within the clarifier 11. This may be accomplished by any suitable means such as a removable cap 39. The opposite end 40 of the skimmer conduit 37 projects well into the confines of the aeration chamber 10 and is axially located, spaced from but yet quite close to, the downwardly and inwardly second inclined surface 41 of the block member 17. This surface 41 will be seen to intersect with the first inclined surface 18 of the block member at the lower edge 19 thereof.

The operation of the skimmer assembly 36 utilizes the effect of the circulating contents within the aeration chamber for the effective removal of floating contaminants from the clarifier chamber into the aeration chamber. From a review of FIG. 2 it will be noted that the uppermost arrows 20 passing over the first inclined surface 18 of the block member 17 will pass the lower edge 19 thereof and produce a slight negative pressure or suction therebehind which suction is being created in an area immediately juxtaposed the skimmer conduit open end 40. The acute angle defined by the first and second inclined surfaces 18 and 41 of the skimmer block further improves the effectiveness of this suction force so that when a user wishes to activate the skimmer assemble 36 it is a simple matter requiring no more than the removal of the cap 39 from the conduit 37 for but a brief time.

User access to the skimmer assembly 36 is provided by means of an access cover 42 normally seated within a mating access opening 43 situated over the top wall 13 of the barrier 12. Additional ones of such covers 44 may be provided for the casing top wall 6 above the area containing the diffuser assembly 21 to allow any maintenance which may be required thereof. Additionally, an opening 45 is provided within the casing top wall 6 above the clarifier chamber 11 and is adapted to accommodate an appropriate riser (not shown) as required to allow venting from the treatment plant and permit fluctuations of the fluid level 31 as sewage is irregularly admitted through the inlet pipe 16 and subsequently exits through the outlet pip 32.

Figures 3, 4:
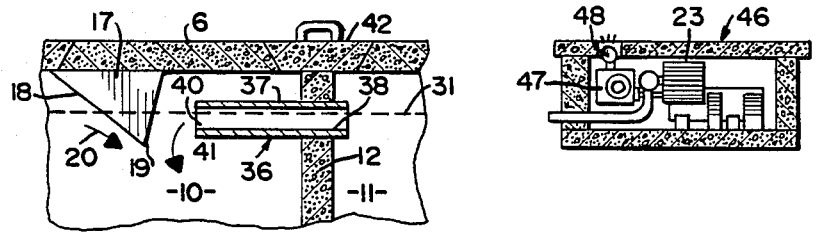
FIG. 3 is a fragmentary view illustrating the skimmer assembly of FIG. 2 as it appears in operation.
FIG. 4 is a vertical sectional view of a typical blower housing as used with the present invention.

The previously mentioned compressor 23 employed to provide air through the supply line 22 of the diffuser assembly 21, is preferably located within a separate blower housing 46 as illustrated in FIG. 4 of the drawing. This allows location of the housing 46 at any point which will most conveniently permit inspection and maintenance of the compressor 23 and its associated time control 47, the latter of which periodically activates the compressor according to the demands dictated by the use of the treatment plant 1.

The control mechanism 47 preferably includes a suitable signal such as a warning light 48 for indicating the presence of a malfunction of the compressor mechanism.

Figure 5:
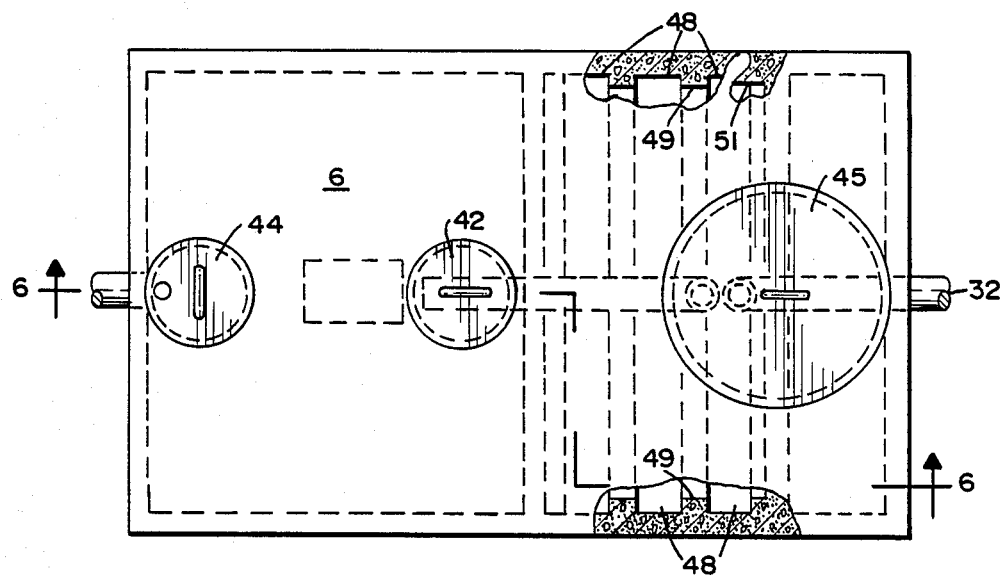
FIG. 5 is a tip plan view, with portions broken away to show underlying structure, of a sewage treatment system according to another embodiment of the present invention.
Figure 6:
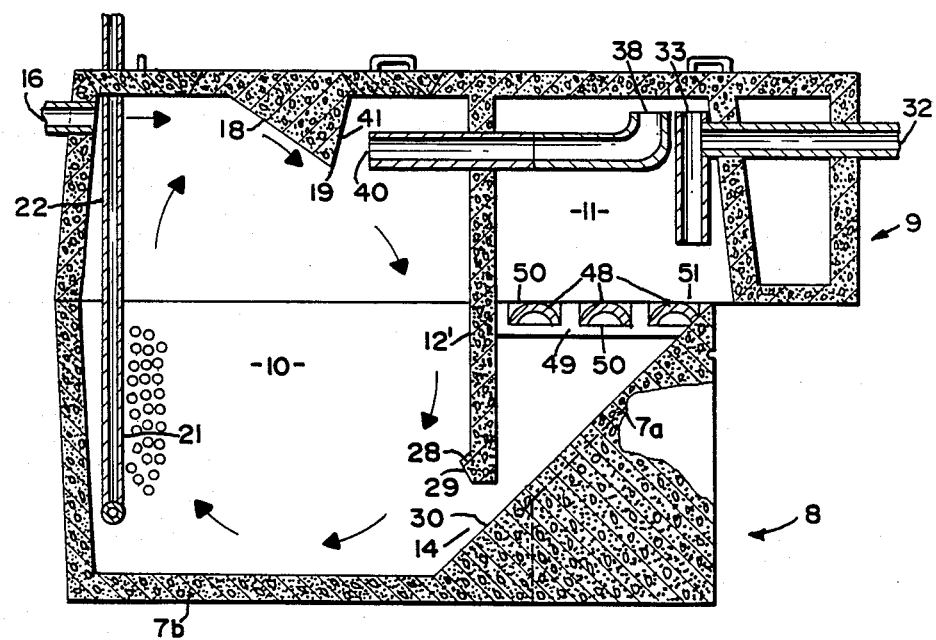
FIG. 6 is a vertical sectional view taken along the one 6—6 of FIG. 5.

Referring to FIGS. 5 and 6 wherein structural elements equivalent to those shown in FIGS. 1-4 are numbered the same, the motion attenuating means provided in this embodiment comprises a plurality of bars 48 extending laterally across the clarifier chamber 11. It is preferred that these bars be positioned at or near the maximum flow area of the clarifier chamber as shown such that maximum entrapment and agglomeration of floc adjacent the underside of the bars is effected while retaining an effective passage rate of effluent material upwardly to the outlet and float material to the top of the clarifier for recycle by the skimmer to the aeration chamber. This entrapment and agglomeration is greatly facilitated by the shape and positioning of the bars, i.e., the concave configuration, wherein the bars extend across the clarifier chamber at the point of this maximum flow area and are dimensioned to reduce said flow area by between about 20% and about 60%, preferably between about 30% and about 50%, and wherein the arcuate cross-section of the bars is dimensioned along its vertical and horizontal axes in a vertical/horizontal ratio of from about 0.15 to about 1, preferably from about 0.35 to about 0.65. It is also preferred that the bars lie substantially in the same plane oriented substantially horizontally of the apparatus in its operative condition. The particular cross-sectional shape of the bars as shown is of course preferred, however other shapes are operable including the inverted channel ⌐ or ∧, and the inverted corrugated ⌒, as well as plain rectangular shapes such as ▭, however, the shape as shown in the drawing has been found to provide the best overall performance.

The present attenuating bars are particularly adaptable to use in the present waste treatment apparatus in that the two-piece sectional construction is sections 8 and 9, provides a convenient means for locking the bars in place. This is accomplished, e.g., by means of a ledge 49 formed integrally with lower section 8 on each side adjacent the tops thereof and provided with recesses 50 into which the ends of the bars rest. By providing a thickened inner lower edge area 51 on each side of upper section 9 to overlie the upper surfaces of the bar ends when the sections are assembled into the unit as shown by the cutaway in FIG. 5, the bars are locked into the position as shown. The bars may consist of any of a variety of materials including stainless steel, rigid plastic including polyolefin, polyamide, polyester, polycarbonate, or the like or ceramic.

A particularly important advantage derived from the use of the attenuating bars is that unusually high air flow volumes to the aerator may be employed. for example, for a conventional plant having an aeration chamber volumetric capacity of about 93 cubic feet the approximate maximum air feed thereto is about 120 ft 3/hr if a proper floc and float material recycle and aeration is to be achieved. The present apparatus however, can employ air feeds of up to about 960 ft 3/hr while retaining effective floc and float material recycle rates. The net effect therefore, of this embodiment is to produce more highly purified effluent per volumetric capacity than has heretofore been possible.

The invention has been described in detail with particular reference to preferred embodiments thereof, but it will be understood that variations and modifications will be effected within the spirit and scope of the invention.

What is claimed is:

1. A waste material treatment apparatus comprising:
   floor, end, and side wall means defining a container for receiving, treating, and discharging said material;
   internal wall means within said container dividing the same into substantially isolated aeration and clarifier chambers, said internal wall means terminating a short distance above said floor means to provide in cooperation with said floor means a material transfer port between said chambers;
   diffuser means in said aeration chamber;
   material inlet means in communication with said aeration chamber near the top thereof;
   material outlet means in communication with said clarifier near the top thereof;
   motion attenuating means mounted in said clarifier chamber intermediate said transfer port and said outlet means for reducing the motion of material in said clarifier chamber and enhancing thereby the settling of floc therefrom for return to said aeration chamber through said port means;
   skimmer means having a conduit through said internal wall means having opposite open ends respectively in communication with said aeration and clarifier chambers;
   removable closure means on said conduit, normally preventing passage of material through said conduit flow guide means, having a deflector member fixedly disposed within said aeration chamber, said member having a first downwardly slanted forward surface on its leading end obtusely angled and longitudinally aligned with and facing the path of material entering said aeration chamber through said inlet means; and having a second downwardly but oppositely slanted surface on its trailing end juxtaposed one end of said conduit whereby material entering said aeration chamber is deflected downwardly by said first surface to create a diminished pressure zone between said second surface and said one conduit such that upon removal of said closure means, float material in said clarifier chamber is sucked into said aeration chamber.

2. A material treatment apparatus according to claim 1 wherein the lowermost portions of said first and second surfaces of said deflector member are substantially coincident.

3. A material treatment apparatus according to claim 1 wherein said first surface of said deflector member is inclined downwardly away from said inlet means and terminates in a lower edge disposed substantially below the plane of said inlet means.

4. A waste material treatment apparatus comprising:
   wall and floor means providing an aeration chamber having a material inlet, and a clarifier chamber having a material outlet, said chambers being separated by internal wall means having its lower edge spaced from said floor means to provide transfer port means interconnecting said chambers;
   skimmer conduit means in an upper portion of said port means and said conduit means being adapted to transfer floc and float material respectively from said clarifier chamber to said aeration chamber;
   a material flow directing system adapted to promote the movement of said floc and float material to the aeration chamber for further aeration chamber in line with said inlet and slanting downwardly generally toward said internal wall means and floor means, the lower edge of said surface lying adjacent an outlet of said skimmer conduit means;
   a second deflector surface on said internal wall means adjacent the lower edge thereof and slanting generally downwardly toward said floor means in a generally opposite direction to said first deflector surface; and
   diffuser means mounted in said aeration chamber and having its outlet positioned adjacent both said floor means and wall means positioned generally opposite said internal wall means, said deflector surfaces and diffuser means in cooperation with the contiguous wall means and the incoming material flow path providing a substantially closed circulation loop having diminished pressure zones adjacent said transfer port and said outlet of said skimmer conduit means.

5. The apparatus of claim 4 wherein motion attenuating means is mounted in said clarifier chamber intermediate said transfer port and said outlet means for reducing the motion of material in said clarifier chamber and enhancing the settling of floc therefrom for return to said aeration chamber through said port means and for enhancing the flotation of low density material for return to the skimmer conduit means to said aerator chamber.

6. The apparatus of claim 5 wherein said attenuating means comprises a plurality of spaced members extending across said clarifier chamber at the point of its maximum flow area, and oriented substantially horizontally to the apparatus in its operative condition.

7. The apparatus of claim 5 wherein said attenuating means comprises a plurality of spaced members each having an arcuate cross-section, and wherein said members are oriented in substantially the same plane with their concave surfaces facing substantially downwardly.

8. The apparatus of claim 5 wherein said attenuating means comprises barrier means dimensioned to reduce the maximum flow area of said clarifier chamber by between about 20% and about 60%.

9. The apparatus of claim 5 wherein said attenuating means comprises barrier means dimensioned to reduce the maximum flow area of said clarifier chamber by between about 30% and about 50%.

10. The apparatus of claim 5 wherein said attenuating means comprises a plurality of spaced members extending across said clarifier chamber at the point of its maximum flow area, said members being dimensioned to reduce said flow area by between about 30% and about 50%.

11. The apparatus of claim 7 wherein said arcuate cross-section is dimensioned along its vertical and horizontal axes in a ratio of from about 0.15 to about 1.

12. The apparatus of claim 7 wherein said arcuate cross-section is dimensioned along its vertical and horizontal axes in a ratio of from about 0.35 to about 0.65.

13. The apparatus of claim 5 wherein the floor means of said clarifier chamber is slanted downwardly toward said aeration chamber and extends a short distance beyond said internal wall means into said aeration chamber to facilitate the transport of said floc through said port and into said aeration chamber for reentry into the aeration process therein.

* * * * *